June 11, 1929.                    E. B. NATHAN                    1,716,831
                 WEATHER OR WINTER CLOSURE FOR AUTOMOBILES
                    Filed Aug. 1, 1925          2 Sheets-Sheet 1
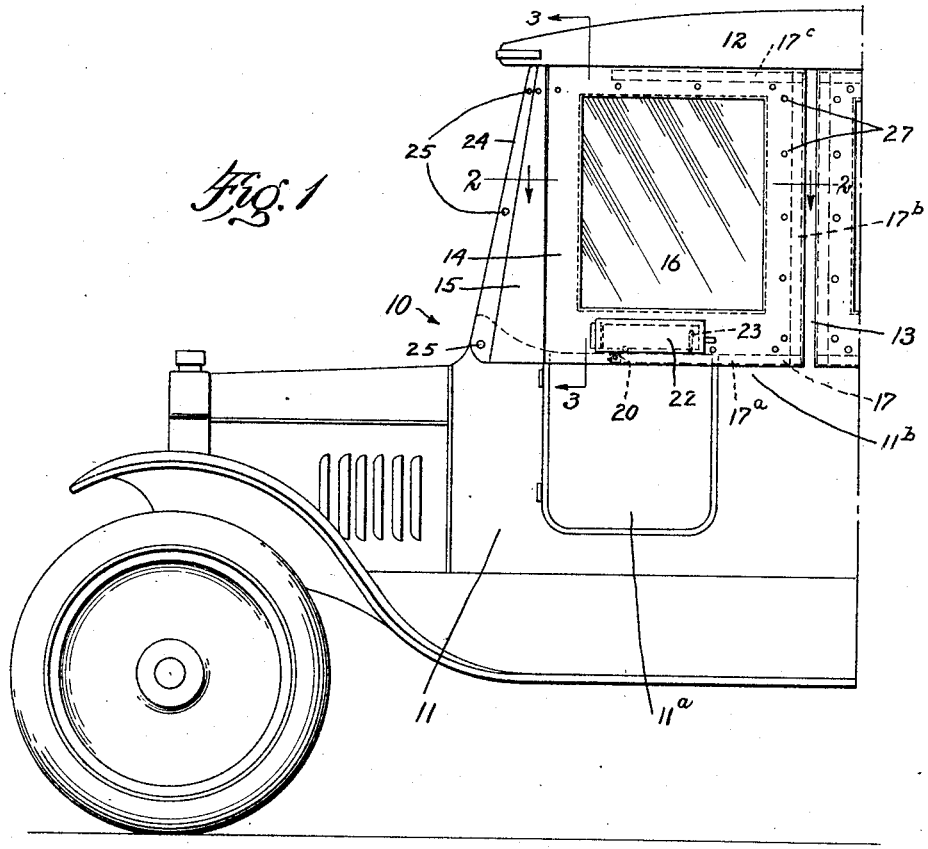
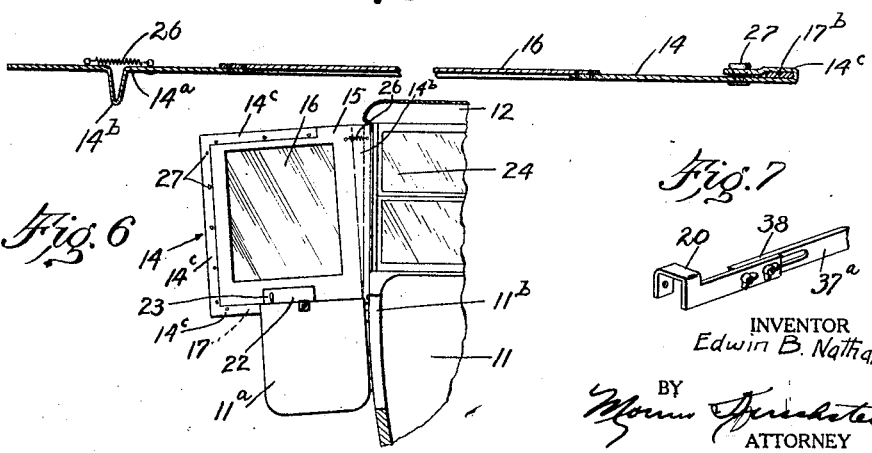
INVENTOR
Edwin B. Nathan.
BY
ATTORNEY June 11, 1929.  E. B. NATHAN  1,716,831
WEATHER OR WINTER CLOSURE FOR AUTOMOBILES
Filed Aug. 1, 1925   2 Sheets-Sheet 2
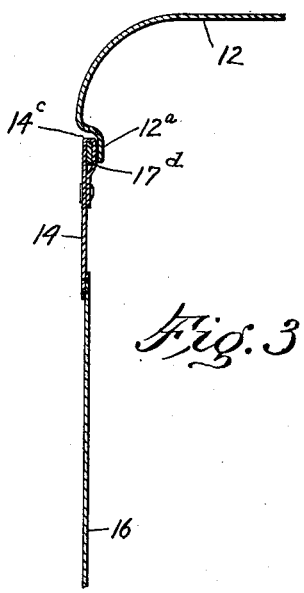
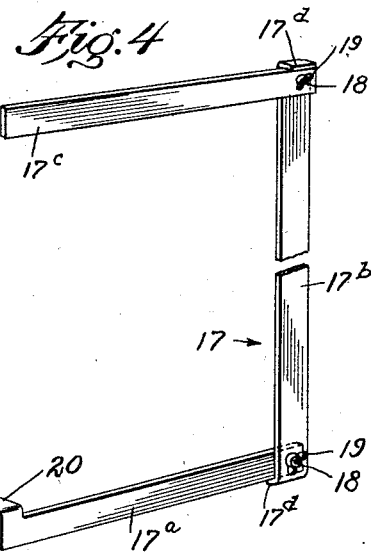
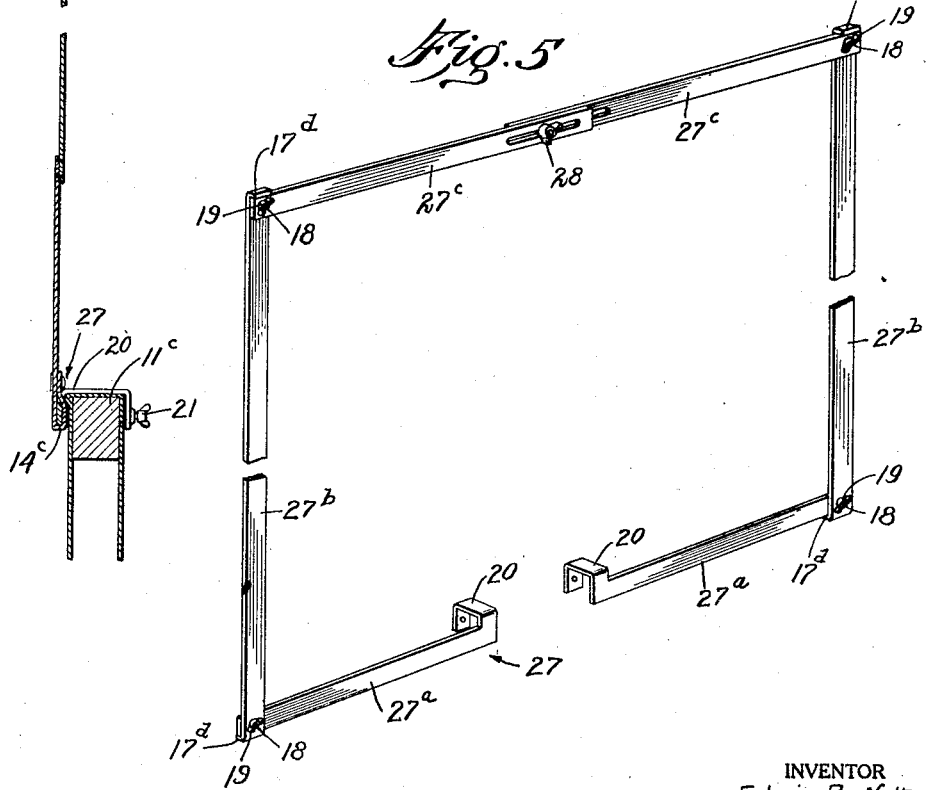
INVENTOR
Edwin B. Nathan
BY
ATTORNEY Patented June 11, 1929.

1,716,831

UNITED STATES PATENT OFFICE.

EDWIN B. NATHAN, OF YONKERS, NEW YORK.

WEATHER OR WINTER CLOSURE FOR AUTOMOBILES.

Application filed August 1, 1925. Serial No. 47,467.

This invention relates to weather and winter closures for automobile touring cars, and more particularly is directed to an improvement in the construction of a panel having a flexible body portion which forms part of the closure structure.

An object of the invention is the provision of an improved panel construction of the character described which includes an adjustable bracing member for stretching and stiffening a flexible body panel portion to form a rigid structure.

Another object of the invention is the provision of an improved panel structure of the character described which comprises a flexible body portion and an adjustable bracing member, said panel structure being adapted to be supported from and to swing with the door of the car body.

A further object of the invention is to provide an improved panel construction for weather or winter automobile body closures comprising few and simple parts, which is cheap to manufacture, neat in appearance, durable in construction, and practical and efficient to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a fragmentary side elevational view of a touring car having a panel embodying the invention;

Fig. 2 is an enlarged cross-sectional view taken on line 2—2 in Fig. 1;

Fig. 3 is an enlarged cross-sectional view taken on line 3—3 in Fig. 1;

Fig. 4 is a perspective view of the adjustable bracing member;

Fig. 5 is a perspective view of a modified form of adjustable bracing member;

Fig. 6 is a fragmentary sectional view of a portion of a touring car showing a panel embodying the invention swung open with the door;

Fig. 7 is a fragmentary perspective view of another modified form of adjustable bracing member.

Referring in detail to the drawing, 10 denotes an automobile having a touring car body 11 with side doors 11$^a$ and a top 12 of any well known construction.

For the car body 11 and top 12, a suitable detachable weather or winter enclosure 13 may be provided, said enclosure having at least one side panel or curtain 14 embodying the invention.

The side panel or curtain 14 may include a body portion 15 made of any suitable weather-proof, flexible fabric such as "leatherette", leather, oil cloth, or the like material, and preferably may be provided with a suitable window 16 formed of celluloid or other bendable, transparent material. Said panel 14 also has an adjustable bracing member 17 which may be demountably secured in any convenient manner to the sides 11$^b$ of the car body 11, preferably being mounted as shown in Figs. 1 and 6, to swing with the door 11$^a$. From Fig. 4 it is seen that the bracing member 17 comprises a vertical part 17$^b$ and one or more parts 17$^a$ and 17$^c$ normally disposed at right angles thereto. Said member 17 may be formed as one integral piece but preferably is constructed with the said parts detachably joined together by providing any suitable means, for example bolts 18, wing nuts 19, and abutting edge portions 17$^d$ on each end of the intermediate part 17$^b$ to form rigid connection at each of the joints.

The free end of the part 17$^a$ is provided with a suitable detachable fastening means such as bracket arm 20 which may be threaded to receive a clamping wing screw 21. Said arm 20 is shaped to fit over the top beaded edge portion 11$^c$ of the body or door and to firmly secure the member 17 thereto as shown in Figs. 3 and 6.

If desired, a hand-hole and closure flap 22 may be provided in the body portion 15 of the panel 14 adjacent the usual lock lever 23 on the door 11$^a$ to permit the manipulation of the said lever 23 from the exterior of the car as shown in Figs. 1 and 6.

The panel 14 when positioned alongside the driver's seat adjacent the front windshield 24 is provided with a flap extension 14$^a$ of flexible material to positively close the space between said panel 14 and the windshield 24. Suitable quickly detachable securing means, such as spaced snap fasteners 25 on the body and the uprights of said wind shield, are provided for securing said extension flap 14$^a$ in position as shown in Fig. 1. The flap 14ª also serves as a hinge support for the panel 14 and, where the door 11ª is arranged to swing from the car body at an angle out of the normal vertical alignment, as in the usual construction, said flap 14ª may be provided with a gusset portion 14ᵇ which may be held in a folded position by a tension spring 26 anchored to the body portion 15 and to flap 14ª to compensate for the said swinging angularity of the door and panel as is clearly shown in Figs. 2 and 6.

In using the invention, the bracing member 17 is fastened to the panel body portion 14 by any suitable means, as by overfolding the edges 14ᶜ of the material of said body portion to form pockets for receiving the parts of said member 17. The edge 14ᶜ may be detachably held in position by spaced snap fasteners 27 so as to permit easy assembling of the panel structure. The flap extension 14ª is then secured to the windshield uprights and body by means of snap fastener 25 and the bracket arm is secured to the upper edge portion of the door 11ª. By adjusting said bracket along the door 11ª the flexible body portion 15 may be stretched so that the panel 14 is substantially smooth and forms a rigid structure swingable with the door.

Where panel 14 is used as a middle closure section or without a flap extension 14ª (not shown), the bracing member may be made in a modified form as shown in Fig. 5. Here the bracing member 27 may be formed with two sets of parts, each set comprising a part 27ª, 27ᵇ and 27ᶜ. These parts are similar in every respect to the corresponding parts 17ª, 17ᵇ and 17ᶜ respectively, with the exception that the parts 27ᶜ may be interlocked at the free end by a sliding connection 28. The sets are held to the body portion of the panel in suitably provided pockets (not shown) similar to those formed by the edge 14ᶜ of the body portion 15 described above. In mounting a panel 14 having a bracing member 27, the two sets of parts are mounted on the door or body and said sets are spaced from each other so as to stretch the body portion 15. The bracing member is then firmly fastened in place by tightening the clamping wing nuts in the bracket arms 20 as is well understood.

It is apparent that the part 17ᶜ of the member 17 and parts 27ᶜ of member 27 may be omitted if desired as these simply serve as a refinement in the construction to cooperate with the depending valance 12ª of the top 12 to form a tight closure as shown in Fig. 3.

Fig. 7 shows a modified construction of the detachable fastening means on the free end of part 37ª corresponding to part 17ª of the bracing member 17. Here part 37ª is made with a slidable connection 38 which permits the bracket arm 20 to be fixedly secured in place requiring no further movement since the adjustment of the length of the part 37ª may be made at the connection 38.

To dismount and disassemble the panel, the latter is detached at the fastening means from the car body and the bracing member removed from the pockets of the body portion. The bracing member may be collapsed and the body portion rolled up, each into compact form for convenient storage in the car.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In a weather or winter closure for a vehicle body having a door, a panel formed of flexible material having an edge portion demountably fastened to a relatively fixed part of the vehicle, and a bracing member detachably secured to said panel at a plurality of sides thereof for supporting the panel, said member being adjustably mounted along the door for stretching the panel to form a rigid structure swingable with said door.

2. In a weather or winter closure for a vehicle body having a door, a panel formed of flexible material having an edge portion demountably fastened to a relatively fixed part of the vehicle, and a bracing member including parallelly disposed portion detachably secured to said panel for supporting the panel, said member having a releasable gripping portion for engaging the edge portion of the door and another portion adjustable with respect to the door for stretching the panel to form a rigid structure swingable with said door.

In testimony whereof I affix my signature.

EDWIN B. NATHAN.